United States Patent Office 2,859,101
Patented Nov. 4, 1958

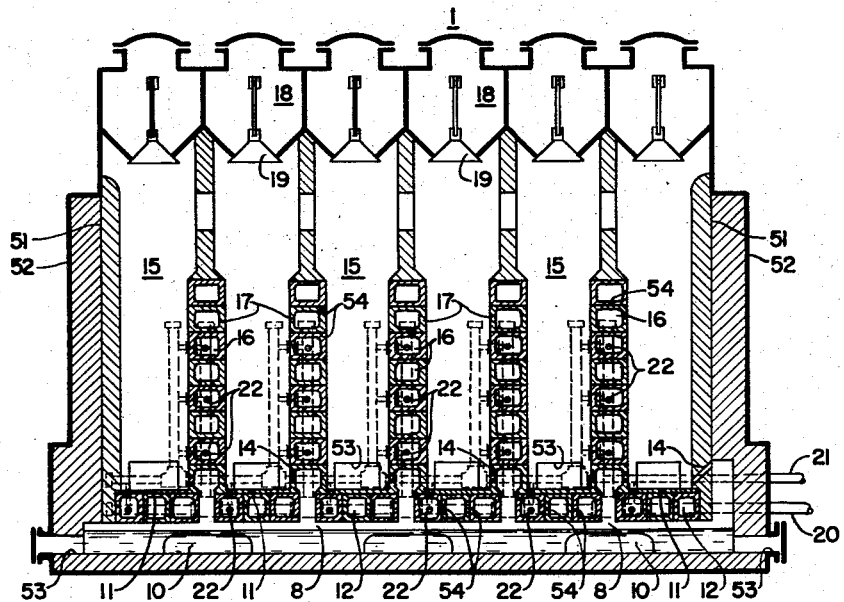
FIG. 3
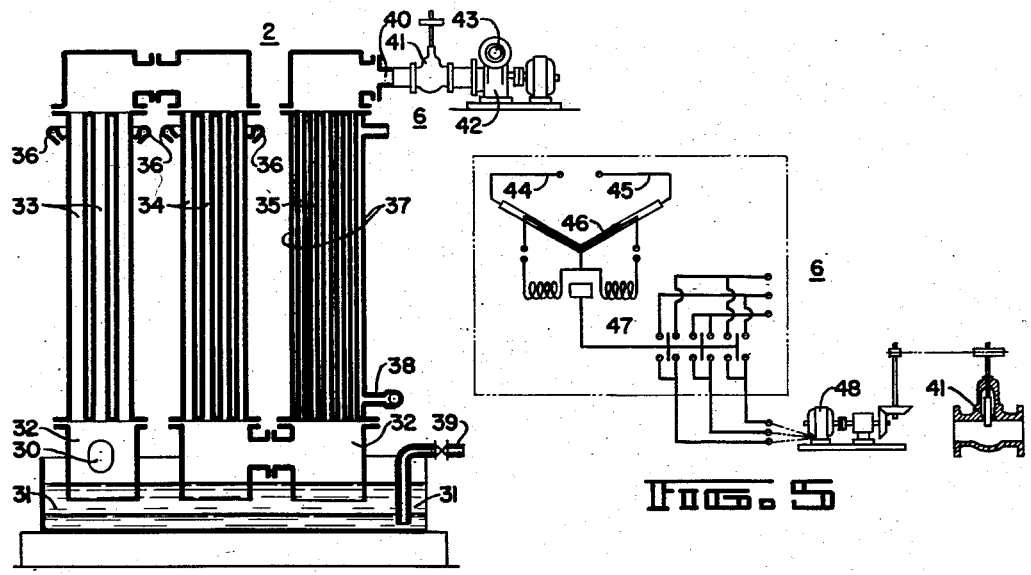
FIG. 4
FIG. 5
*INVENTOR.*
YOKOTA NOBUO
BY Waters, Roditi & Schwartz
AGENTS

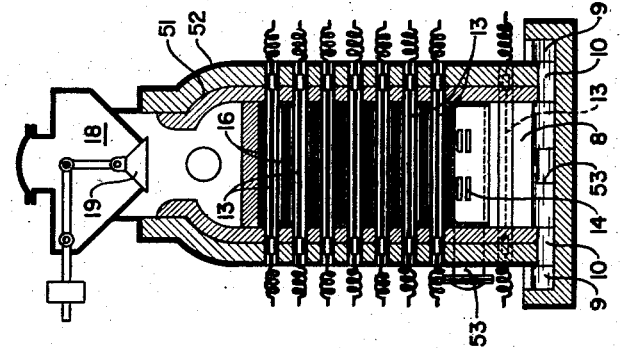
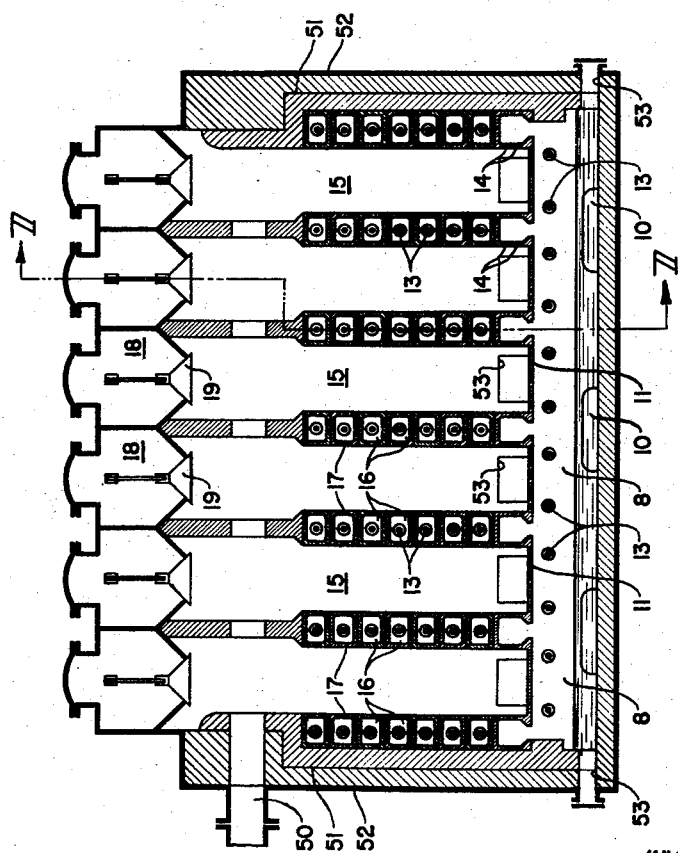

2,859,101

REACTION FURNACE FOR PRODUCING CARBON DISULPHIDE

Yokota Nobuo, Toyohama-cho, Mitoyo-gun, Kagawa-ken, Japan, assignor to Shikoku Kasei Kogyo Company, Limited, Marugame-shi, Kagawa-ken, Japan, a corporation of Japan Application April 8, 1953, Serial No. 347,553

Claims priority, application Japan May 21, 1952

8 Claims. (Cl. 23—277)

The present invention relates to a reaction furnace for the production of carbon disulphide comprising reaction chambers, heating chambers and a sulphur vaporizing chamber, the reaction and heating chambers being alternately arranged side by side, and the sulphur vaporizing chamber being arranged below the reaction and heating chambers.

The object of the present invention is to provide an improved apparatus for producing carbon disulphide economically and on a large scale.

Another object is to provide an improved apparatus which has a large productive capacity, a compact and durable body, and is safely and easily operated.

Another object is to provide an improved apparatus for efficiently producing carbon disulphide by electric or gaseous heating.

Other objects will become hereinafter apparent.

Figure 1:
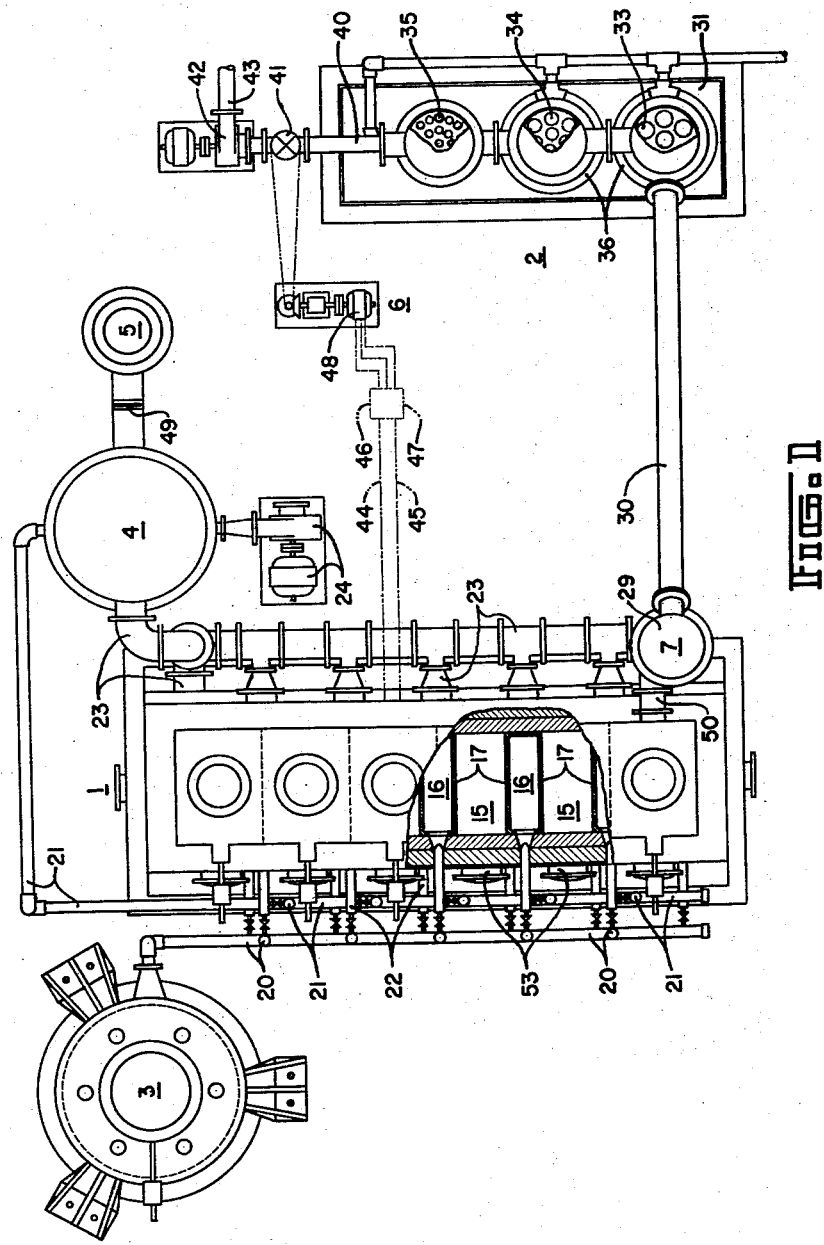
Figure 2:
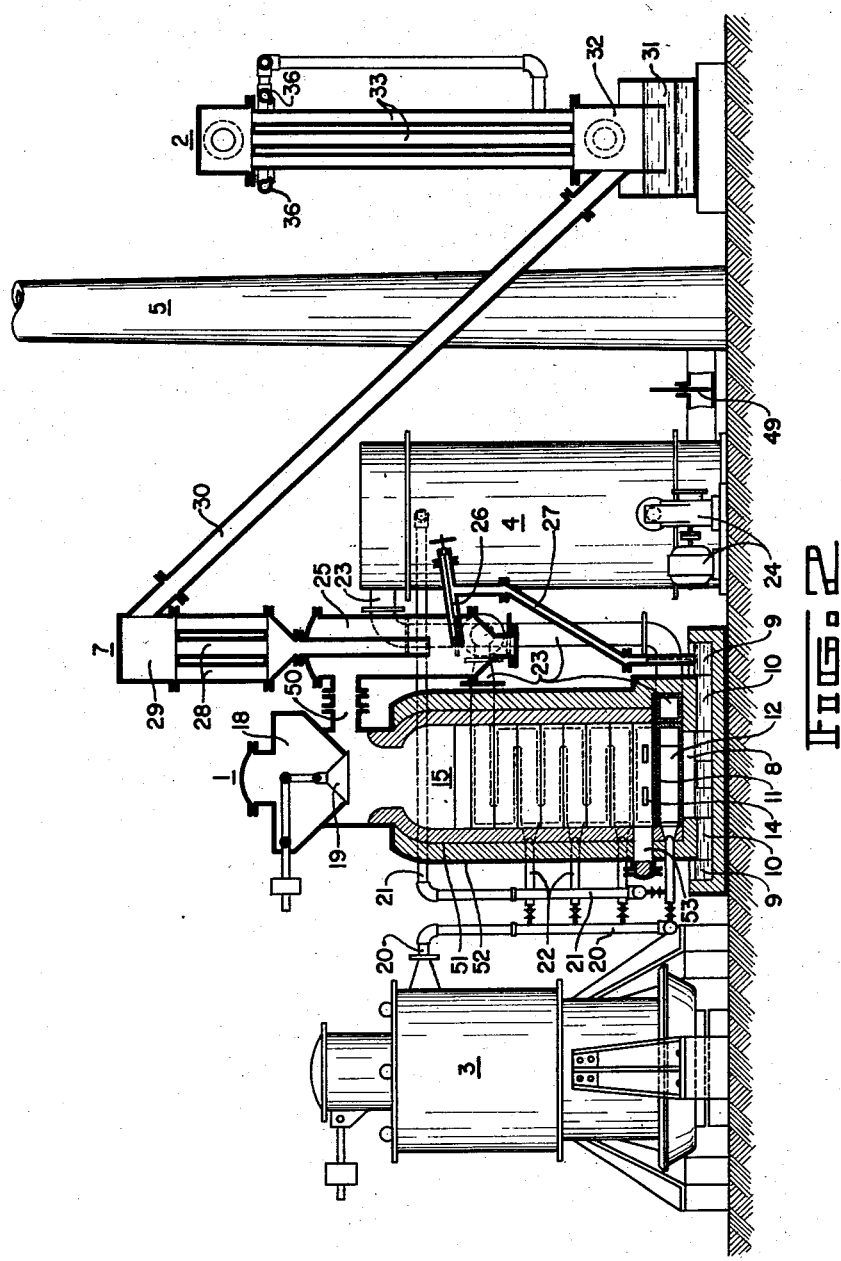

Referring to the accompanying drawings:

Figures 1 to 5 show one example of the apparatus; Fig. 1 and Fig. 2 are a plan view and a vertical section of the apparatus; Fig. 3 is a vertical section of the reaction furnace; Fig. 4 is a vertical section of the condensing apparatus and a part of the pressure control equipment; Fig. 5 is another part of the pressure control equipment.

Fig. 6 and Fig. 7 show another example of the reaction furnace. Fig. 6 is a vertical section of the reaction furnace and Fig. 7 is a vertical section taken along the line 7—7 of Fig. 6.

As shown in Figs. 1 and 2, a reaction furnace 1 embodying the present invention is operated in association with a gas generator 3, a recuperator 4, a chimney 5, an automatic or manual pressure controlling equipment 6, a condensing apparatus 2 and an unreacted sulphur separator 7.

The reaction furnace 1 is composed of reaction chambers 15, heating chambers 16, a sulphur vaporizing chamber 8 and surrounding walls 51, which are composed of refractory material such as fire brick, and an outer metallic shell 52.

The reaction chambers 15 and the heating chambers 16 are alternately arranged side by side above a horizontal wall 11 and the sulphur vaporizing chamber 8 is arranged below the wall 11 under chambers 15 and 16. Additional heating chambers 12 are arranged under horizontal wall 11 to form the ceiling of the sulphur vaporizing chamber 8.

Molten sulphur which has been melted in a suitable melting tank, (not shown) is supplied into the feeding hole 9 and flows into the sulphur vaporizing chamber 8 through the passage 10 and forms a pool of molten sulphur on the bottom of the sulphur vaporizing chamber 8. The sulphur vaporizing chamber 8 is isolated from the outside by the sealing of molten sulphur in passage 10.

Molten sulphur in the vaporizing chamber 8 is vaporized into sulphur vapor by the radiant heat of the heating chambers 12 and is fed into the bottom parts of the reaction chambers 15 by way of passages in the wall 11 and through the inclined holes 14, which are arranged at the lower parts of the side walls of the reaction chambers 15. The inclined holes 14 are arranged so as to allow no irruption of carbonaceous material and its ash from the reaction chambers 15 into the sulphur vaporizing chamber 8.

Carbonaceous material such as charcoal from feeder 18 is supplied to the reaction chamber 15 through the bell 19 and is heated up to the reaction temperature and reacts with sulphur vapor, which ascends in the reaction chamber 15, to form vapor of carbon disulphide.

Producer gas, generated at the gas generator 3 and passed through the gas duct 20 and preheated air, which is heated in the recuperator 4 and passed through the air feeding pipe 21, are fed, through the gas burner 22, into the heating chambers 12, 16 where combustion takes place. The products of combustion in both heating chambers indirectly heat the reaction chambers 15 and the sulphur vaporizing chamber 8 and leave, through the flue 23, into the recuperator 4 where they preheat the air which is driven into the recuperator 4 by the blower 24 and is fed to the gas burners 22. The combustion products leave recuperator 4 and are led through the diameter 49 to the chimney 5.

The vapor of carbon disulphide, formed in the reaction chamber 15 and containing some unreacted sulphur, is led, through the duct 50, into the sulphur separator 25 of cyclone type and separates a part of the unreacted sulphur as liquid, and goes up into the vertical air-cooled multitube cooler 28, which is arranged upon said sulphur separator 25 whereby most of the unreacted sulphur is separated as liquid, and the vapor is led, through the top space 29, into the steeply inclined air-cooled duct 30.

Unreacted sulphur, liquified and separated in the sulphur separator 25 and the vertical air-cooled multitube cooler 28, stays at the bottom of the sulphur separator 25 and is removed, through the pipe 27, into the sulphur feeding hole 9 by opening the needle valve 26.

The vapor of carbon disulphide in the top space 29, which is gradually cooled while descending the steep passage of the air-cooled duct 30, is led into the lower part of the condenser 2 and then condensed to crude liquid carbon disulphide during passage through the vertical multitube condensers 33, 34 and 35. The crude liquid carbon disulphide is stored in the crude receiver 31 and flows out through the syphon pipe 39. The vertical multitube condensers 33 and 34 are wetted and cooled by cooling water which is fed from nozzles 36 to the outside surface of said condensers. The base of the condensers 33, 34 and 35 open toward the crude receiver 31 and are sealed by the water in that receiver. The air cooled duct 30 and the vertical multitube condensers 33 and 34, inside of which solid sulphur may adhere are slightly hammered from the outside, and exfoliated solid sulphur will fall into the water in the crude receiver 31 and can be taken out from it. The vertical multitube condenser 35, inside of which solid sulphur does not adhere has a cooling mantle 37 and is cooled by cool brine which is fed from the inlet 38 and completely liquefies the vapor of carbon disulphide. Waste gas after the vapor of carbon disulphide liquefies is led into the waste gas duct 40 and is led, through the automatic or manual pressure control valve 41 and exhaust fan 42, into a waste gas recovering apparatus (not shown) through the waste gas duct 43.

The pressure difference between the reaction chamber 15 and heating chamber 16 and the pressure difference between the sulphur vaporizing chamber 8 and the heating chamber 12 are respectively indicated by a manometer 46, through the slender pipes 44 and 45. On manual control, the pressure controlling valve 41 is operated by hand with reference to the indication of the manometer 46, and on automatic control by automatic control equipments 47 and 48, the pressures in the reaction chamber 15 and sulphur vaporizing chamber 8 are respectively balanced to the pressures in the heating chambers 16 and 12. Furthermore, the pressures in the heating chambers 16 and 12 may be controlled by controlling the waste gas to the chimney 5 by means of damper 49.

Another example which employs electric heating is shown in Figs. 6 and 7. Electric heating elements 13, which are covered with heat-resisting and anti-corrosive materials, such as a silica tube, are horizontally and parallelly arranged at the same level over the surface of molten sulphur in the sulphur vaporizing chamber 8 under the horizontal wall 11, and also arranged in the mufflers, which are arranged one upon the other in the heating chamber 16, as the heating source instead of gaseous heating. But in this case, it is unnecessary to control the pressure in the chambers as mentioned above.

For electric heating elements commercial electric resistors of carborundum rod are employed. Each electric resistor is covered with a cylindrical slica tube. Otherwise the resistor would soon be eaten away by the sulphurous vapor. The silica tubes are fixed to the outer metallic shell 52 of the reaction furnace 1, maintaining the furnace gas-tight. The electric heating elements 13 in the heating chambers 16 and the sulphur vaporizing chamber 8 are electrically connected to suitable electric regulators (not shown).

As occasion demands, residues or ashes of carbonaceous material and sulphur are removed from ash discharging holes 53, which are provided at the bottom of the reaction chambers 15 and the sulphur vaporizing chamber 8.

The advantages of this apparatus will be explained as follows:

Because the reaction chambers and the heating chambers are alternately arranged side by side and the sulphur vaporizing chamber is arranged below the reaction and heating chambers, the volume of the furnace can be considerably reduced and a mass-production furnace can be cheaply constructed, and high heat efficiency may be achieved.

Because sulphur is vaporized from its surface by radiant heating of the heating wall of the heating chambers or electric heating elements, the sulphur vaporizing chamber can be constructed of heat resisting, anti-corrosive and durable materials such as fire brick, and a large amount of sulphur can be vaporized with good efficiency as occasion demands, without being troubled by the residue which sulphur contains.

Because the sulphur vaporizing chamber and the reaction chambers are divided by a horizontal wall as formerly explained, charcoal and its residue are not allowed to break in the sulphur vaporizing chamber, and consequently sulphur is vaporized efficiently. The loss of raw materials, because of the discharge of charcoal residue and sulphur residue, will be minimized. Furthermore, as such construction reduces the size of the furnace, high heat efficiency can be obtained.

Because the pressures of the reaction and heating chamber are balanced by controlling equipment, the vertical wall between the reaction chamber and the heating chamber can be constructed of heat resisting and anti-corrosive materials such as fire brick, which have not complete gas-tightness. Nevertheless, there is no loss of raw materials and products by gas leakage through the wall. Consequently, a remarkably durable furnace can be constructed. Furthermore, as the reaction chamber can be strongly heated the productive capacity of this furnace will be considerably increased.

In the case where electric heating elements are employed as the heating source, a more remarkably durable furnace can be constructed of heat-resisting and anti-corrosive materials such as fire brick.

I claim:

1. A reaction furnace for producing carbon disulphide comprising a rectangular, upstanding housing having an apertured horizontal dividing wall extending thereacross spaced from but adjacent the bottom to divide the interior of the housing into a flat rectangular sulphur vaporizing chamber at the bottom of said housing below said wall and a relatively large space in said housing above said wall, means for supplying molten sulphur to said sulphur vaporizing chamber, heating means in the upper part of said chamber for vaporizing the sulphur in the latter, a series of spaced apart, parallel vertical walls extending across said relatively large space to divide the latter into alternately arranged, side-by-side heating chambers and reaction chambers of rectangular cross-section having said vertical walls in common so that heat from said heating chambers can be transferred directly through said vertical walls to the adjacent reaction chambers, means for heating the interiors of said heating chambers, a separate horizontal partition extending between said vertical walls at the bottom of below each heating chamber at a level above that of said horizontal dividing wall to define the bottom of the related heating chamber and the top of a communicating chamber, said horizontal wall having apertures for communicating said sulphur vaporizing chamber with each of said communicating chambers, said vertical walls having passages in the lower portions thereof opening from said communicating chambers into the adjacent reaction chambers to admit sulphur vapor to the latter by way of said sulphur vaporizing chamber and said communicating chambers, said passages being inclined downwardly in the direction from the related communicating chamber to the related reaction chamber, means for feeding carbonaceous materials into each of said reaction chambers at the top of the latter to be heated within the reaction chambers by heat transfer from the adjacent heating chambers, and means for discharging carbon disulphide from the upper portions of said reaction chambers.

2. A reaction furnace for producing carbon disulphide as in claim 1; wherein said heating means in the upper part of said sulphur vaporizing chamber includes additional heating chambers arranged under said horizontal wall, and means for circulating hot products of fuel combustion through said additional heating chambers.

3. A reaction furnace for producing carbon disulphide as in claim 2; wherein said means for heating the interiors of the first mentioned heating chambers includes means for circulating hot products of fuel combustion through said first mentioned heating chambers.

4. A reaction furnace for producing carbon disulphide as in claim 1; wherein said means for heating the interiors of said heating chambers includes means for circulating hot products of fuel combustion through said heating chambers.

5. A reaction furnace for producing carbon disulphide as in claim 4; wherein said heating means in the upper part of said sulphur vaporizing chamber includes electric heating elements covered with heat-resisting and anti-corrosive materials arranged horizontally and parallel to each other in said upper part of the sulphur vaporizing chamber.

6. A reaction furnace for producing carbon disulphide as in claim 1; wherein said heating means in the upper part of said sulphur vaporizing chamber includes electric heating elements covered with heat resisting and anti-corrosive materials arranged horizontally and parallel to each other in said upper part of the sulphur vaporizing chamber.

7. A reaction furnace for producing carbon disulphide as in claim 1; wherein said means for heating the interiors of said heating chambers includes a series of electric heating elements covered with heat resisting and anti-corrosive materials and arranged horizontally, one above the other, in each of said heating chambers.

8. A reaction furnace for producing carbon disulphide as in claim 1; wherein each of said heating chambers has a series of horizontally extending, vertically spaced apart partitions therein between the related vertical walls, said partitions in each heating chamber having their alternate opposite ends spaced from said housing to define a tortuous passage through the related heating chamber; and wherein said means for heating the interiors of said heating chambers includes means for supplying hot products of fuel combustion to said tortuous passage of each heating chamber and means for discharging such products of combustion from the upper end of each heating chamber.

References Cited in the file of this patent

UNITED STATES PATENTS

| | | |
|---|---|---|
| 158,924 | Faure et al. | Jan. 19, 1875 |
| 702,117 | Taylor | June 10, 1902 |
| 1,009,625 | Arsem | Nov. 21, 1911 |
| 1,585,344 | Greenawalt | May 18, 1926 |
| 2,046,818 | Harkness | July 7, 1936 |
| 2,248,509 | Parsons | July 8, 1941 |
| 2,498,145 | Tinken | Nov. 12, 1946 |
| 2,411,097 | Kopp | Feb. 21, 1950 |
| 2,670,277 | Charles | Feb. 23, 1954 |
| 2,708,156 | Paolini | May 10, 1955 |